United States Patent Office 2,921,648
Patented Jan. 19, 1960

2,921,648

METHOD FOR THE RECOVERY OF ACETYLENE FROM GAS MIXTURES

Gustav Allan Wetterholm and Kåre Ragnvald Fossan, Gyttorp, Sweden, assignors to Nitroglycerin Aktiebolaget, Gyttorp, Sweden, a corporation of Sweden No Drawing. Application March 20, 1956
Serial No. 572,612

Claims priority, application Sweden March 21, 1955

6 Claims. (Cl. 183—115)

This invention relates to a method for recovering pure or substantially pure acetylene from acetylene-containing gas mixtures which are obtained by the conversion of hydrocarbons.

In the modern high-temperature processes for the production of acetylene from gas mixtures containing hydrocarbons, such as hydrocarbon mixtures containing low-molecular aliphatic hydrocarbons, by conversion in an electric arc or in accordance with the Wulff process (Kirk-Othmer: Encyclopedia of Chemical Technology, volume 1, page 111), gas mixtures are obtained with acetylene contents between 5 and 20%. Other components of said gas mixtures are ethylene, $CO_2$, CO, $CH_4$, hydrogen, oxygen and nitrogen.

In order to recover acetylene which is as pure as possible from these gas mixtures, hitherto washing with water under high pressure or treatment with selective solvents, such as dimethyl formamide or butyro lactone, have been employed. Of these two solvents, butyro lactone has a lower vapour pressure and a lower solubility for acetylene, whereas dimethyl formamide has both a higher vapour pressure and a greater solubility for acetylene. In the recovery of the acetylene from the dimethyl formamide solution, the high vapour pressure of the dimethyl formamide renders necessary a comprehensive washing of the acetylene gas driven out from the dimethyl formamide solution, which in this case is effected by heating up to 120° C. in order to remove the vapourized dimethylformamide from the acetylene gas.

According to the present invention it has now been found that low-molecular dialkyl sulfoxides such as dimethyl, diethyl, methyl-ethyl and methyl-propyl sulfoxides are excellent solvents or absorption agents for the recovery of acetylene from such gas mixtures. At the same time these sulfoxides possess a high solubility for acetylene, satisfactory selectivity and a low vapour pressure.

A comparison of the conditions of solubility and selectivity between dimethyl sulfoxide and dimethyl formamide is given in the following table in which the solubility of the gases ordinarily occuring in such gas mixtures is given. In the column "percent by weight" of the table the content of the different gases is indicated which dimethyl sulfoxide and dimethyl formamide respectively absorb on saturation at 20° C. from pure (100%) gas of this kind.

|  | Dimethyl sulfoxide at 20° C. | | Dimethyl formamide at 20° C. | |
|---|---|---|---|---|
|  | Percent by weight | Volume gas/volume solvent | Percent by weight | Volume gas/volume solvent |
| Acetylene | 2.9 | 29 | 3.2 | 29 |
| Ethylene | 0.32 | 2.8 | 0.4 | 3.6 |
| $CO_2$ | 0.5 | 3.0 | 0.95 | 4.7 |
| CO | 0.01 | | 0.01 | |
| $CH_4$ | 0.00 | | 0.00 | |
| $H_2$ | 0.00 | | 0.00 | |
| $O_2$ | 0.01 | | 0.01 | |
| $N_2$ | 0.00 | | 0.00 | |

As will be seen from the table, the selectivity of the dimethyl sulfoxide as far as ethylene and $CO_2$ are concerned is considerably greater than that of the dimethyl formamide.

It has been found further that the recovery of the acetylene from the dialkyl sulfoxide solution can be effected in a very simple manner, namely by cooling down the solution sufficiently.

On the basis of this discovery, the process according to the invention comprises absorbing the acetylene in the gas mixture in a low-molecular dialkyl sulfoxide in the liquid state and cooling down the absorption solution so-obtained so that the dialkyl sulfoxide crystallizes out, whereby the acetylene is released and passes off and is then recovered.

In carrying out the process, the acetylene-containing gas is brought into intimate contact with the dialkyl sulfoxide, in a scrubber, for example. Absorption may take place in one or more steps and, if desired, under pressure, for example up to 5 or 10, or 20 or 30 atm., in which case the content of the acetylene dissolved in the dialkyl sulfoxide will, of course, be greater.

The cooling down of the resultant absorption solution for the crystallization of the solvent can be carried out without difficulty. Thus, dimethyl sulfoxide has a melting point of 18°.45 and diethyl sulfoxide has a melting point of about 20°.5, for example, the said melting or freezing points falling a few degrees on the solution of the acetylene. Consequently, it is possible to freeze an acetylene-saturated dimethyl sulfoxide solution at about 12–13°. On the crystallizing out of the dialkyl sulfoxide the acetylene is released so completely that only a very insignificant residue of the order of 0.1–0.2% by weight remains in the crystals. In all probability a part of the gas remains enclosed in channels in the mass of crystals, on which account the whole of the gas is not removed by freezing. In order to recover this last residue also, it is possible, if considered desirable, to resort to evacuation or the subsequent heating up of the solvent.

The recovered acetylene possesses a high degree of purity, usually exceeding 99%. Since the vapour pressure of the dialkyl sulfoxides is very low—dimethyl sulfoxide at 20° has a vapour pressure of 0.42 mm. Hg while dimethyl formamide at the same temperature has a vapour pressure of about 40 mm. Hg—washing out the vaporized solvent from the released acetylene gas is scarcely necessary. However, if it is desired to free the acetylene gas from any small quantities of other gases also, the gas may be washed again with dialkyl sulfoxide, whereupon the acetylene can be obtained with a purity of substantially 100%.

For the absorption it may be of advantage to proceed by first using as the absorption medium the above-mentioned dialkyl sulfoxide solution from a preceding absorption which contains 0.1–0.2% acetylene by weight, followed by fresh dialkyl sulfoxide. On the repeated use of the same liquid quantity of dialkyl sulfoxide as an absorption medium the more soluble acetylene derivatives, such as methyl and vinylacetylene contained therein are enriched, however. It is preferable, therefore, to heat up the absorption liquid from time to time in order to drive out these easily soluble compounds. By heating up in this way it is also possible to remove any moisture absorbed by the dialkyl sulfoxide. The presence of such moisture does not appreciably decrease the solubility of the acetylene, but it renders crystallization more difficult.

*Example 1*

A gas mixture obtained by conversion of low-molecular aliphatic hydrocarbons and containing 15% acetylene was passed through a scrubber with dimethyl sulfoxide at 20° C. The outgoing solution was saturated with acetylene in equilibrium with said gas mixture and retained about 1.2% of the same. This solution was cooled down with water to about 13° C. whereupon the sulfoxide began to crystallize. The temperature remained between 12.5 and 13° C., during the whole of the freezing process. The residue of acetylene in the frozen crystals amounted to 0.25%. No attempt was made to attain more favourable evaporating conditions by endeavouring to form a thin layer of the crystal mass. By evacuation down to 15 mm. Hg for a very short time, the acetylene content dropped to 0.14%. The degree of purity of the acetylene obtained exceeded 99%.

*Example 2*

A gas mixture obtained by conversion of low-molecular hydrocarbons and containing 10% acetylene was dried, compressed to 5 atm. and washed with liquid diethyl sulfoxide. The acetylene concentration in the solution so obtained amounted to 3.1%. The solution was cooled down to +15° C., whereupon the sulfoxide became crystallized and the acetylene boiled away. The acetylene residue in the crystals amounted to about 0.2%.

What we claim is:

1. A novel process for the selective separation and recovery of at least about 99% pure acetylene from gas mixtures produced by the high temperature conversion of hydrocarbons, said gas mixtures containing between about 5 and 20% of acetylene which comprises:

(a) passing the said gas mixture into intimate contact with a low-molecular weight dialkyl sulfoxide in the liquid state, the alkyl groups of said dialkyl sulfoxide being selected from the group consisting of methyl, ethyl and propyl, (b) contacting said sulfoxide and said gas mixture for a sufficient time to absorb a quantity of acetylene gas in said sulfoxide, (c) separating the residual gas mixture from the liquid sulfoxide containing absorbed acetylene, (d) cooling the liquid sulfoxide containing absorbed acetylene until the sulfoxide crystallizes and releases absorbed acetylene gases, and (e) recovering the released acetylene gases.

2. The novel process of claim 1 wherein the absorption of the acetylene from the gas mixture is carried out under pressure.

3. The novel process of claim 1 wherein the absorption of the acetylene is effected in several steps.

4. The method of claim 1 wherein the absorption solution is used repeatedly and is heated up from time to time in order to drive off the relatively easily soluble acetylene derivatives dissolved therein.

5. The method of claim 1 wherein the dialkyl sulfoxide is dimethyl sulfoxide.

6. The method of claim 1 wherein the dialkyl sulfoxide is diethyl sulfoxide.

References Cited in the file of this patent

UNITED STATES PATENTS

| | | |
|---|---|---|
| 2,365,898 | Morris et al. | Dec. 26, 1944 |
| 2,405,693 | Hamill et al. | Aug. 13, 1946 |
| 2,539,871 | Smedslund | Jan. 30, 1951 |
| 2,741,332 | Finneran et al. | Apr. 10, 1956 |